United States Patent
Doshay

(12)
(10) Patent No.: US 6,364,026 B1
(45) Date of Patent: Apr. 2, 2002

(54) ROBOTIC FIRE PROTECTION SYSTEM

(76) Inventor: Irving Doshay, 380 Surfview Dr., Pacific Palisades, CA (US) 90272

( * ) Notice: Subject to any disclaimer, the term of this patent is extended or adjusted under 35 U.S.C. 154(b) by 0 days.

(21) Appl. No.: 09/271,626

(22) Filed: Mar. 17, 1999

Related U.S. Application Data

(60) Provisional application No. 60/080,332, filed on Apr. 1, 1998.

(51) Int. Cl.[7] .................................................. A62C 2/00
(52) U.S. Cl. ............................. 169/47; 169/46; 169/53; 169/56; 169/36
(58) Field of Search .............................. 169/46, 47, 52, 169/53, 54, 56, 30, 36; 244/189, 190, 136

(56) References Cited

U.S. PATENT DOCUMENTS

| | | | | |
|---|---|---|---|---|
| 2,359,573 A | * | 10/1944 | MacKay ....................... | 169/36 |
| 4,666,105 A | * | 5/1987 | Dellinger et al. ............. | 244/63 |
| 5,503,350 A | * | 4/1996 | Foote .......................... | 244/190 |
| 5,507,350 A | * | 4/1996 | Primlani ...................... | 169/47 |
| 5,794,889 A | * | 8/1998 | Bailey ......................... | 169/47 |
| 5,878,819 A | * | 3/1999 | Denoize et al. ............... | 169/53 |
| 5,959,423 A | * | 9/1999 | Nakanishi et al. ..... | 318/566.12 |

FOREIGN PATENT DOCUMENTS

| | | | | |
|---|---|---|---|---|
| DE | 4032672 A | * | 4/1992 | .................. 169/53 |
| EP | 579219 A1 | * | 1/1994 | .................. 169/53 |

* cited by examiner

*Primary Examiner*—David A Scherbel
*Assistant Examiner*—Christopher S. Kim
(74) *Attorney, Agent, or Firm*—Norton R. Townsley

(57) ABSTRACT

A fire fighting system comprising a set of unmanned, aircraft, fire detection subsystems; a set of launch-on-need, unmanned aircraft, fire suppression subsystems; and a manned, central, robotic vehicle flight control and monitoring station. When deployed, the robotic survey vehicles continuously patrol the wildland so that fires can be detected when they first start. The robotic extinguisher vehicles, which contain fire suppressant or extinguisher are deployed on rocket assist or other automated take-off launchers at critical locations throughout the wildland. The pilot at the central monitoring station controls the flight path of the survey vehicles and continuously receives video and fire scan information from them. Upon detection of a fire signal, its position is determined via use of a Global Positioning Satellite (GPS) system and permission is sought from the applicable security agency to launch an extinguisher vehicle. When permission is granted, the pilot at the central monitoring station provides the fire co-ordinates to the nearest, available extinguisher vehicle and initiates its launch. This vehicle flies to the location, performing rough homing with its onboard infrared (IR) sensor and final targeting via video camera and assistance from the GPS data, drops its fire suppressant on the fire, circles the fire to assess drop results and heads to a pre-established landing strip. At the landing strip, the extinguisher vehicle is checked out, re-loaded with another extinguisher payload and another launch assist device and again deployed in the wildland.

8 Claims, 5 Drawing Sheets

ROBOTIC FIRE PROTECTION SYSTEM

REFERENCES

This invention was the subject of Disclosure Document No. 360,188 received by the US Patent and Trademark Office on Aug. 22, 1994. The Applicant claims the benefit of his Provisional Application, Ser. No. 60/080,332, filed Apr. 1, 1998.

BACKGROUND OF THE INVENTION

The present invention relates to the field of fire protection and more particularly to robotic means of providing such protection via unmanned air vehicles. While this invention is primarily intended for, and this specification only addresses, wildlands fire protection, it will be obvious that this invention can be utilized to protect areas other than just wildlands, e.g. oil lands, from the damaging effects of fires.

There are over 21 billion acres of forest in the world, over 5 billion in North America and over 1 billion in the United States. These forests provide watershed, habitat for animals, residential and recreation sites for humans, and a resource for timber. Every year much of these forests is destroyed by forest fires. The following table summarizes the cost of timber lost annually.

|  | Billions of acres of forest | Millions of acres burned | Thousands of fires annually | Value of lost timber ($ billion) | Cost to replant ($ billion) | Total timber loss ($ billion) |
| --- | --- | --- | --- | --- | --- | --- |
| Unites States | 1 | 4 to 7 | 100 to 150 | 0.5 | 0.5 | 1 |
| North America | 5 | 20 to 40 | 500 to 800 | 2.5 | 2.5 | 5 |
| World | 21 | 80 to 160 | 2000 to 3000 | 10 | 10 | 20 |

What this table does not reflect are the incidental and consequential losses from wildland fires. Costs of fire fighting, loss of adjacent assets, loss of watershed, later mud slides, loss of livelihood and disruption of lives and trade are hard to calculate in every case. But, for example, as a direct result of a recent forest fire in Kuala Lumpur, the US Embassy had to be shut down because of air pollution. In another recent fire around Sydney, Australia, businesses were forced to close because of air pollution. Such fires typically result in losses in the hundreds of millions of dollars. The last wildland fire starting in Malibu, Calif. and burning to Topanga Canyon was reported to have destroyed 15,000 acres of high value assets with total property losses of $1–2 billion.

Wildland fires start small. Many are started by lightening. Then they spread rapidly, especially in dry locations and if there is a high wind. In the time from detection until fire fighters typically reach the scene an initially 20 foot diameter fire can reach a diameter of 3 miles.

The traditional approach to fighting fires has been truck based fire fighting. In this approach many men and fire trucks are dispatched to try to extinguish the fire with water, chemical fire suppression agents and by eliminating the fuel via back fires. They typically also need to cut fire breaks so that they reach and extinguish small pockets of fire sequentially. The advantages of traditional truck based fire fighting are: reasonable cost, minimum training and ease of maintenance. The disadvantages are: it is inherently slow (it takes time to assemble the men and equipment and time for them to reach the fire), it does not save the wildland and other assets in the vicinity (at best it controls the fire) and a system of fire roads must be created and maintained.

The other more recent approach to fighting wildland fires is by manned aircraft, both fixed wing and rotary wing craft (i.e. helicopters). The big advantage of this approach is access to remote areas. The standard method of implementing this approach is with on call manpower and aircraft. This method has low effectiveness because of the time needed to assemble before resources can be applied. The other method of implementing this approach is with continuously available manpower and aircraft. This latter approach does make the method more effective, but the cost of having men and machines constantly available is usually prohibitive. In any case the cost for maintenance and support of aircraft, especially helicopters, is very high.

What is needed is a fire fighting system that is constantly vigilant, constantly available, able to apply fire suppression almost immediately after a fire is detected, easy to maintain and low in cost. Development of a such a wildland fire fighting system represents a great improvement in the field of fire fighting and satisfies a long felt need of the entire world.

SUMMARY OF THE INVENTION

The system described below is an invention intended to satisfy the need identified above. This invention is a fire fighting system that is constantly vigilant, constantly available, able to apply fire suppression almost immediately after a fire is detected, easy to maintain and low in cost. The present invention comprises a set of unmanned aircraft, fire detection subsystems, which comprise the robotic survey vehicles; a set of launch-on-need, unmanned aircraft, fire suppression subsystems, which comprise the robotic extinguisher vehicles; and a manned, central, robotic vehicle flight control and monitoring station. Augmentation of the detection capabilities of the robotic survey vehicles by tethered balloons and human observers in fixed locations, as has been done in the past by the US Forest Service, is not necessary for this system. When deployed, the robotic survey vehicles continuously patrol the wildland so that fires can be detected when they first start. The robotic extinguisher vehicles, which contain fire suppressant or extinguisher are deployed on rocket assist take-off launchers, or other automated mobile launchers, at critical locations throughout the wildland. Fire suppressant can be in the form of powder, liquid or packages designed to open and dispense fire suppressant to cover the entire fire surface upon impact.

The pilot at the central monitoring station controls the flight path of the survey vehicles and continuously receives video and fire scan information from them. Upon detection of a fire signal, the signal is verified and its position is determined via use of a Global Positioning Satellite (GPS) receiver signal and a monitor map overlay. The fire location is cleared for extinguisher drop after permission is sought and obtained from the applicable security agency to launch an extinguisher vehicle. When permission is granted, the pilot at the central monitoring station provides the fire co-ordinates to the nearest, available extinguisher vehicle and initiates its launch. This vehicle flies to the location, performing final homing with its onboard infrared (IR) sensor and video camera with assistance from the GPS data and video display with map overlay used by the central flight control station, drops its fire suppressant on the target fire, assesses drop results and heads to a pre-established landing strip at the wildland perimeter. The landing strip may be located at the central control station. At the landing strip, the extinguisher vehicle is checked out, re-loaded with another extinguisher payload and, if applicable, another launch rocket and again deployed in the wildland.

The advantages of this invention are:

it provides rapid response to a fire, it avoids delays associated with rounding up men and equipment, it has a low maintenance cost, all the equipment is recoverable and reusable, its deployment population and distance between extinguisher delivery vehicles is similar to that of fire truck deployment in a large city surrounded by wildlands, and the only continuous manpower needed is the control and monitoring pilot and refurbishing crew.

Use of this invention costs less than that of using manned approaches to fighting "just started" wildland fires. Primarily, this invention reduces wildland fire related losses of area assets from devastating levels to negligible levels by putting fires out early. Use of this invention reduces ancillary damage, such as that caused by smoke, pollution, destruction of structures and wildlife, and destruction of timber itself. To put things in perspective, the loss resulting from the Malibu/Topanga fire described above is more than one thousand times the current estimated price and life cycle cost of the system described herein.

An appreciation of the other aims and objectives of the present invention and an understanding of it may be achieved by referring to the accompanying drawings and description of a preferred embodiment.

DETAILED DESCRIPTION OF THE PREFERRED EMBODIMENT

Figure 1:
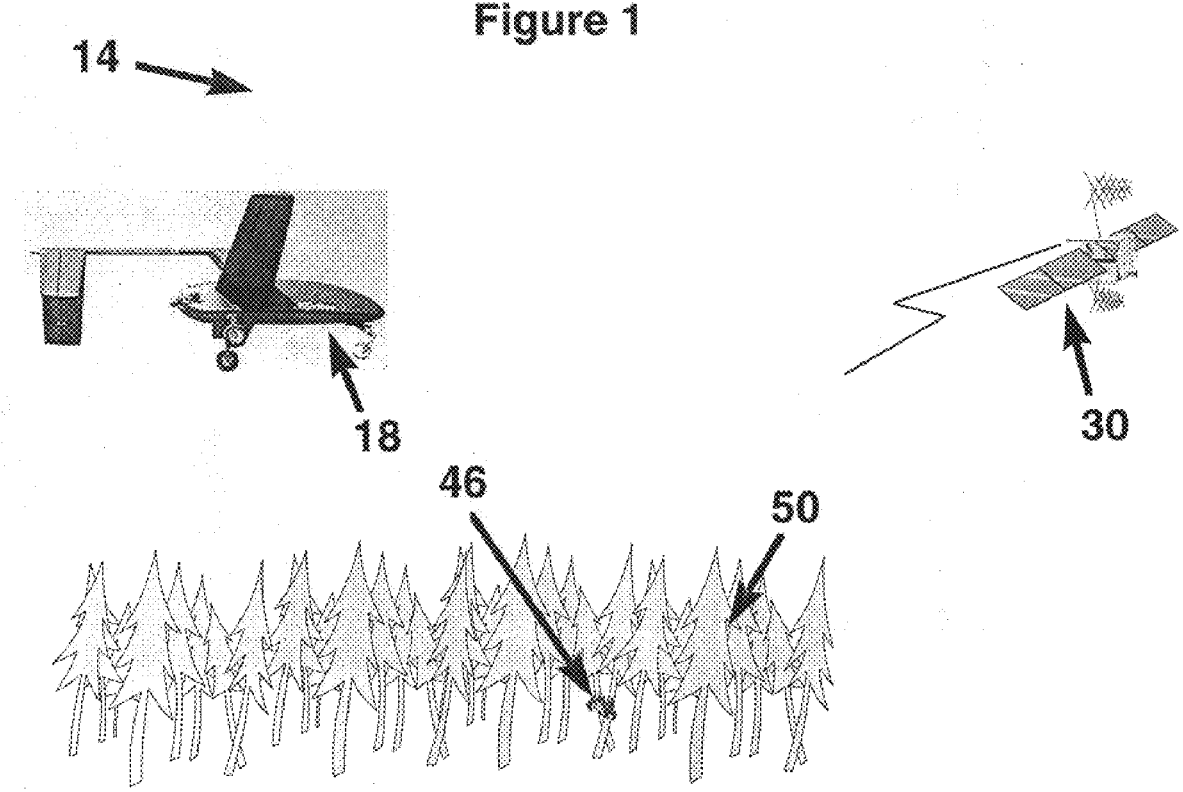
FIG. 1 is a schematic diagram representing the constant fire detection portion of the system.

FIG. 1 is a diagram representing the fire detection subsystem 14 of the system 10. The fire detection portion 14 of the system comprises an unmanned air vehicle 18, the survey vehicle, with an onboard video camera, fire (IR) scanner and data communication subsystem (not separately illustrated). The data communication subsystem is capable of communicating with a central control and monitoring station 54 (illustrated in FIG. 3), which is capable of controlling the flight path of the survey vehicle 18. The survey vehicle 18 is also capable of communicating with the GPS system 30 in order to secure and pass on to the control station 54 accurate data for flight guidance to the fire location. These data are used to generate guidance blips on the video display map overlay at the central control and monitoring station 54.

Figure 2:
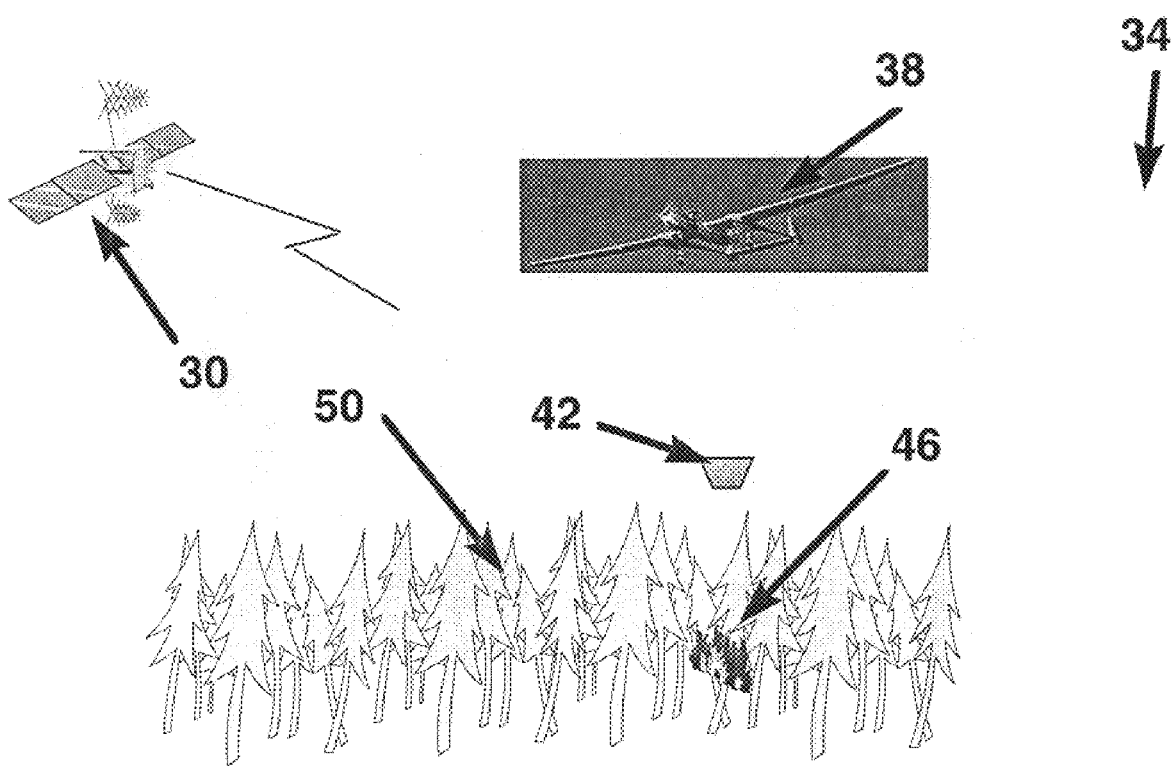
FIG. 2 is a schematic diagram representing the fire suppression portion of the system.

FIG. 2 is a diagram representing the fire suppression portion 34 of the system 10. The fire suppression portion 34 comprises another, much larger, unmanned air vehicle 38, the extinguisher vehicle, with an onboard video camera, a fire (IR) homing subsystem, a data communication subsystem and an extinguisher dispenser bay (not illustrated). The extinguisher vehicle 38 is preferably equipped with an auxiliary rocket (also not illustrated) for rapid acceleration and to avoid the need for a take off-strip. While liquid or powder suppressants can be used, preferably, a package of fire suppressant 42 is held in the dispenser bay. The onboard data communication subsystem is capable of communicating with the central monitoring station, in order, inter alia, to send video signals and receive vehicle control commands that steer it to the fire location coordinates; and the GPS system 30, in order to secure and pass on accurate position information to the control station 54 on the map overlay.

Upon locating the fire 46 and receiving appropriate clearance, which will be discussed in more detail later, the extinguisher vehicle 38 is launched, guided to the fire location, and upon receiving an "on target" signal, releases the fire suppression package 42 from its dispenser bay. This package 42 is designed to open and dispense fire suppressant upon impact.

Figure 3:
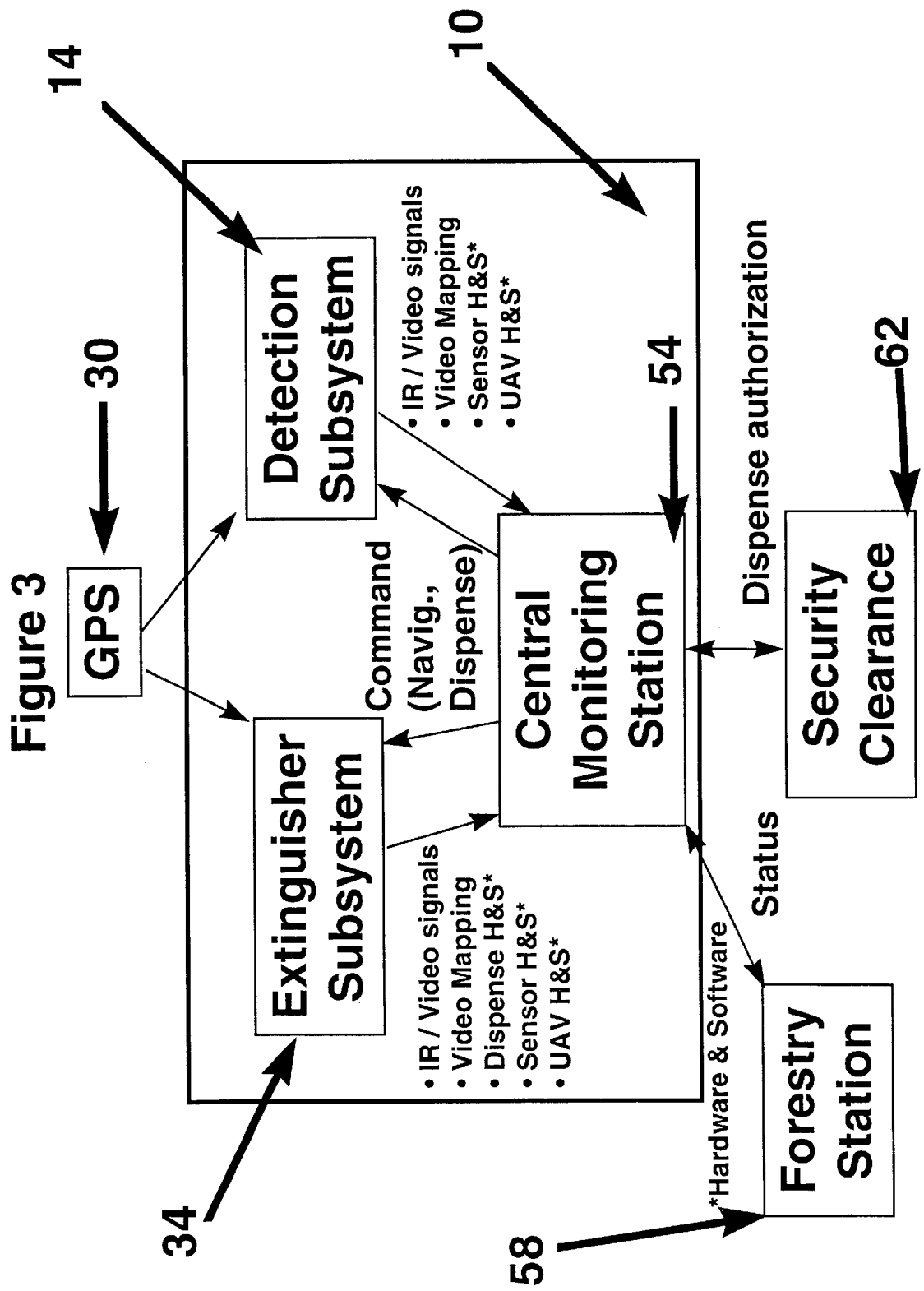
FIG. 3 is an interface diagram of the system.

FIG. 3 is an interface block diagram of the system 10. It shows the components of the system 10 and how they interface with internal external elements. Referring to FIGS. 1 and 2 in conjunction with FIG. 3, it will be seen that the system 10 works as follows. A set of survey vehicles 18 patrol a given area of wildland, possibly day and night during times of high risk. Each survey vehicle 18 flies a predetermined and constantly repeating path over the wildland 50 and intermittently transmits video and scanner signals to a central monitoring station 54 for review (and recording as necessary) by a human observer. Periodically (typically after at least 12 flight hours), the survey aircraft 18 are returned to the perimeter landing strip for refueling. As it flies, each survey vehicle 18 keeps track of its precise location, as well as the surrounding surveyed ground area, via communication with the GPS system 30.

Meanwhile, a set of extinguisher vehicles 38 are on launchers on the ground, at predetermined launch locations. They are kept in a constant state of launch readiness via automated checking. Personnel in the central monitoring station 54 provide periodic status reports to the applicable local fire department and forestry service 58. When a fire is detected by any one of the survey vehicles 18, this fact is instantly communicated to personnel in the central monitoring station 54.

Once the fire 46 and its location are verified by the robotic survey vehicle 18, control personnel in the central monitoring station 54 request area security clearance from an external security service 62 to launch a robotic extinguisher vehicle 38 . This is necessary to prevent dropping extinguisher on people. Once clearance is given, monitor station pilot selects the nearest available robotic extinguisher vehicle 38, using the coordinates of the fire 46, and initiates launch. The extinguisher vehicle 38 is commanded by the station flight control pilot to fly to the co-ordinates of the fire 46. The vehicle uses its IR sensor for rough homing on the fire 46. It sends its IR sensor and video data to the flight control subsystem for accurate homing in on the fire 46. Upon receiving an "on-target" signal from the control station 54 it drops the package of fire suppressant 42 on the target fire 46. The pilot at the control station 54 provides the "on-target" release signal from his or her monitoring of the video and IR sensor data.

The extinguisher vehicle 38 flies at pre-established safe and approved altitude ranges to the fire area but may, when safe, reduce altitude to under 100 feet above the local terrain to drop its extinguisher package 42. Once the package 42 has been dropped, the extinguisher vehicle 38 is commanded to circle the fire target 46 so that the pilot can monitor success of the drop via IR and video signals, and then is commanded to fly to the wildland perimeter landing strip and land. Once landed, it is checked, re-supplied with fire suppressant 42 and a launch rocket and refueled. Note that video is used by the monitor/controller pilot in targeting of the fire and releasing of extinguisher 42. The video display is also recorded at the monitoring station for later review of conditions (including the potential presence of arsonists) at the fire site 46. Later the extinguisher vehicle 38 is returned to its prior location. Also, the extinguisher vehicle 38 circles the fire site 46 to provide visual results information to the monitoring pilot before being commanded by the pilot to land and be refurbished for return to duty. Note that the survey vehicle 18 does not have its survey pattern interrupted by or for surveillance of extinguisher vehicle 38 activity.

Figure 4:
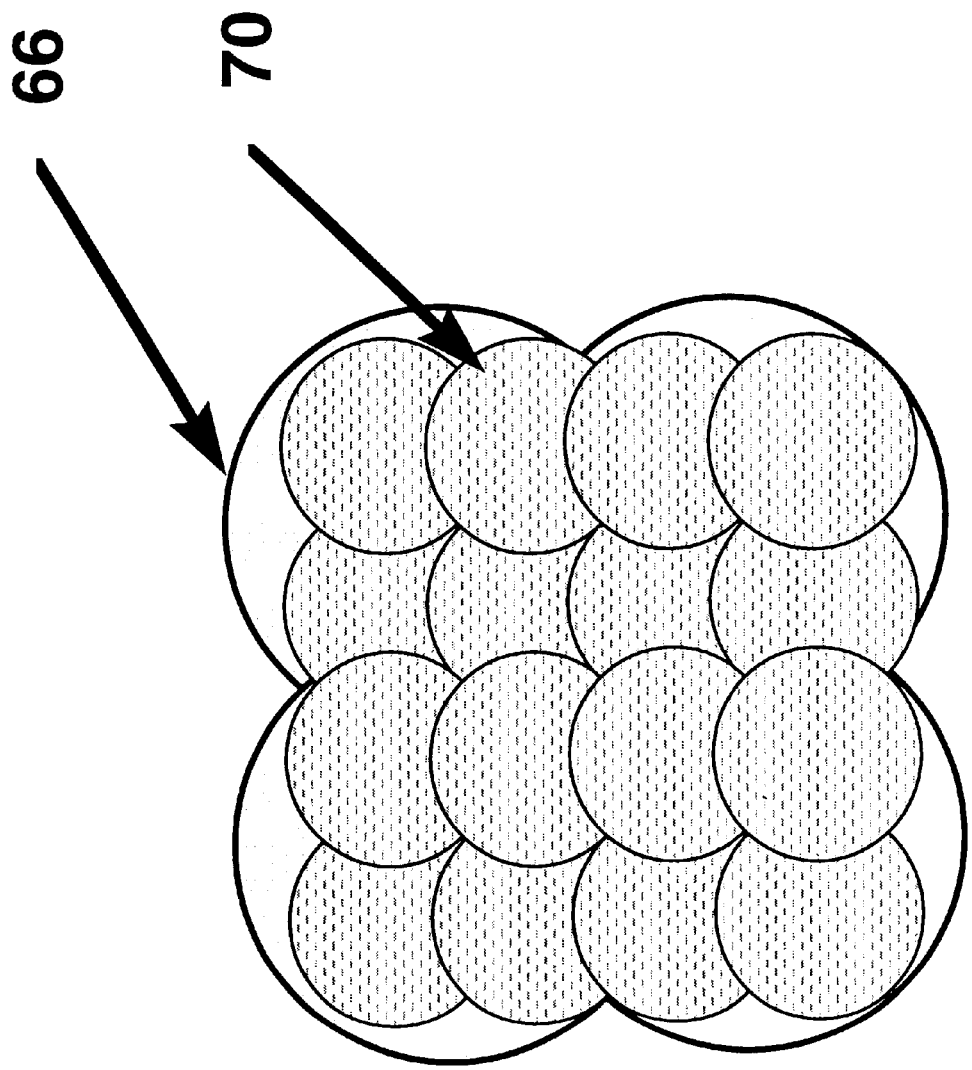
FIG. 4 is a diagram showing typical deployment of the vehicles.

FIG. 4 is a diagram showing typical deployment coverage of the vehicles 18, 38. With currently available technology, a survey vehicle 18 can effectively cover a 20 mile diameter area 66 and an extinguisher vehicle 38 with a 50 gallon extinguisher pack 42 can effectively cover a 10 mile diameter area 70. Thus deployment would be as shown in FIG. 4. Preferably, each survey vehicle 18 continuously patrols a small racetrack at 10,000 to 15,000 feet. The on-board IR scanning sensor scans a 20 mile diameter region every 15 seconds. Signals are continuously transmitted to the mission control center 54.

Figure 5:
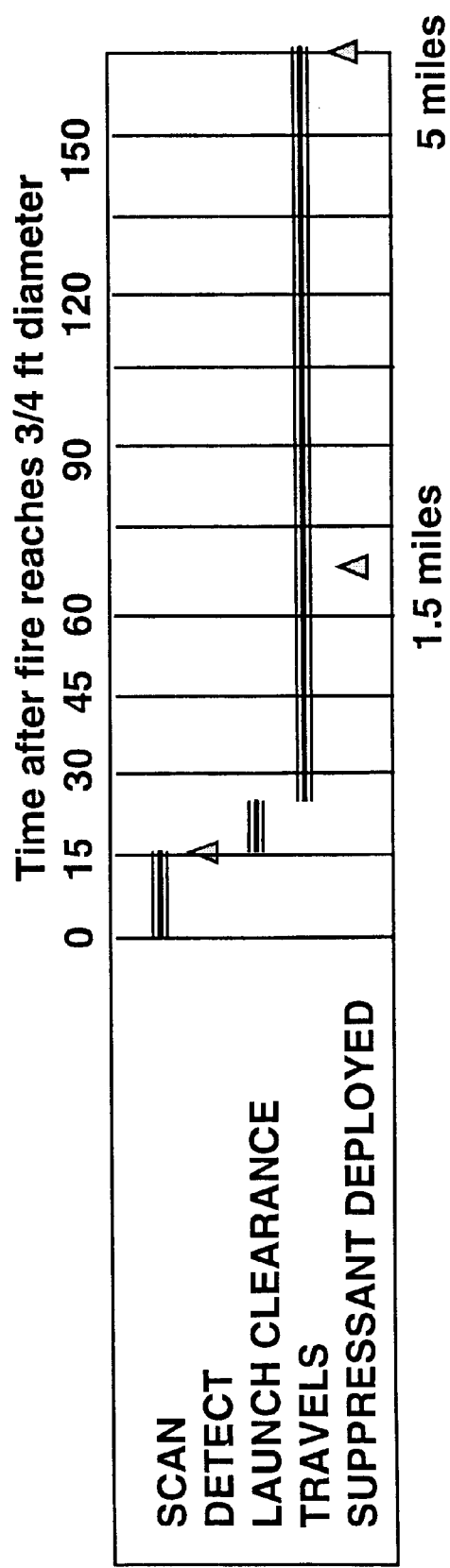
FIG. 5 is a chart showing typical response times for the system.

FIG. 5 is a chart showing typical response times for the system 10. Depending on the exact location of the fire 46, with current technology, fire suppressant 42 can be delivered to extinguish the fire in from about 30 to 180 seconds.

The following reference numerals are used on FIGS. 1 through 5:

| | |
|---|---|
| 10 | Robotic wildland fire protection system |
| 14 | Fire detection subsystem |
| 18 | Survey vehicle |
| 30 | Global Positioning Satellite (GPS) |
| 34 | Fire suppression subsystem |
| 38 | Extinguisher vehicle |
| 42 | Fire suppressant package |
| 46 | Fire |
| 50 | Wildland |
| 54 | Central monitoring station |
| 58 | Forestry Service Station |
| 62 | Security Clearance |
| 66 | Area patrolled by survey vehicle |
| 70 | Area protected by each extinguisher vehicle |

The robotic fire protection system 10 has been described with reference to a particular embodiment. Other modifications and enhancements can be made without departing from the spirit and scope of the claims that follow.

What is claimed is:

1. A robotic fire protection system comprising:
   a a manned control and monitoring station;
   b a robotic survey vehicle which is designed to:
      (i) continually patrol an area which it is desired to protect from fire damage;
      (ii) continuously survey said area while patrolling;
      (iii) obtain accurate position information from the GPS system;
      (iv) provide video and IR status information to said control and monitoring station about the fire status of said area; and
      (v) be remotely controlled from said control and monitoring station;
   c a robotic fire suppression vehicle which is designed to:
      (i) be maintained in a state of readiness at a strategic location within said area;
      (ii) carry a quantity of fire suppressant;
      (iii) rapidly reach a fire utilizing IR detection for rough guidance;
      (iv) provide video and IR feedback to said control and monitoring station to allow accurate guidance to said fire and provide information about the status of said fire;
      (v) obtain accurate position information from the GPS system;
      (vi) be remotely launched and controlled from said control and monitoring station; and
      (vii) administer said fire suppressant to said fire upon command.

2. A robotic fire protection system as claimed in claim 1 in which said robotic survey vehicle and said robotic fire suppression vehicle are an unmanned air vehicles.

3. A robotic fire protection system comprising:
   a a robotic survey vehicle which is adapted for and is continually patrolling and surveying an area which it is desired to protect from fire damage;
   b a robotic fire suppression vehicle adapted for administering fire suppressing agents upon command, which is deployed at a strategic location within said area; and
   c a manned, control and monitoring station which is designed for remote control of said robotic survey vehicle and said robotic fire suppression vehicle; said vehicles adapted for communication with and control by said control and monitoring station.

4. A robotic fire protection system as claimed in claim 3 in which said robotic survey vehicle comprises: a first unmanned air vehicle, and a video camera, a fire (IR) scanner, a GPS communication subsystem and a communication subsystem adapted for communication with said control and monitoring station, all located on board said first unmanned air vehicle.

5. A robotic fire protection system as claimed in claim 4 in which said robotic fire suppression vehicle comprises: a second unmanned air vehicle, and a video camera, a fire homing (IR) subsystem, a GPS communication subsystem, a container, a quantity of fire suppressant in said container, a means for dispensing said fire suppressant, a rocket takeoff assist mechanism and a communication subsystem adapted for communication with said control and monitoring station, all located on board said second unmanned air vehicle.

6. A robotic fire protection system as claimed in claim 5 in which said container is designed to be dropped upon a fire and to open and disperse said fire suppressant on impact.

7. A robotic fire protection system as claimed in claim 6 in which said means for dispersing said fire suppressant is a mechanism which holds said container during flight and releases said container upon command.

8. A method for robotic fire protection comprising the steps of:
   a providing a control and monitoring station;
   b providing a robotic survey vehicle which is designed to:
      (i) continually patrol an area which it is desired to protect from fire damage;
      (ii) continuously survey said area while patrolling;
      (iii) obtain accurate position information from the GPS system;
      (iv) provide video and IR status information to said control and monitoring station about the fire status of said area; and (v) be remotely controlled from said control and monitoring station;

c providing a robotic fire suppression vehicle which is designed to:
   (i) be maintained in a state of readiness at a strategic location within said area;
   (ii) carry a quantity of fire suppressant;
   (iii) rapidly take off and fly to a fire utilizing IR detection for rough guidance;
   (iv) provide video and IR feedback to said control and monitoring station to allow accurate guidance to said fire and provide information about the status of said fire;
   (v) obtain accurate position information from the GPS system;
   (vi) be remotely launched and controlled from said control and monitoring station; and
   (vii) administer said fire suppressant to said fire upon command;

d from said control and monitoring station:
   (i) commanding said robotic survey vehicle to patrol said area;
   (ii) receiving, analyzing and, if necessary, recording said status information from said robotic survey vehicle;
   (iii) commanding said robotic survey vehicle to land, as required, for refueling;
   (iv) upon detection of a fire:
      (1) determining the exact location of said fire utilizing, among other information, said accurate position information;
      (2) requesting clearance to administer said suppressant from a cognizant security agency;
      (3) commanding said robotic fire suppression vehicle to take off and fly to said exact location of said fire;
      (4) analyzing said video and IR feedback from said robotic fire suppression vehicle;
      (5) if appropriate, commanding said robotic fire suppression vehicle to administer said suppressant; and
      (6) commanding said robotic fire suppression vehicle to fly to a predesignated landing zone;
   (v) checking and resupplying said robotic fire suppression vehicle; and
   (vi) making periodic reports to said cognizant security agency and a Forestry Service.

\* \* \* \* \*